United States Patent

Keen et al.

[11] 4,030,452
[45] June 21, 1977

[54] FEED DISPENSING HOPPER

[75] Inventors: Everett M. Keen; Anthony J. Siciliano, both of Vineland, N.J.

[73] Assignee: Diamond International Corporation, New York, N.Y.

[22] Filed: Oct. 28, 1975

[21] Appl. No.: 626,178

[52] U.S. Cl. .......................... 119/52 B; 119/52 AF; 222/200

[51] Int. Cl.² .......................................... A01K 5/02

[58] Field of Search ............. 119/52 B, 52 A, 52 R, 119/57, 52 AF, 56 A, 53, 54, 55, 51 R, 56 R; 221/200, 204, 205; 222/161, 196, 198, 200, 203, 280, 185, 232; 209/245; 34/166

[56] References Cited

UNITED STATES PATENTS

| | | | |
|---|---|---|---|
| 1,346,025 | 7/1920 | Hinder et al. | 119/54 |
| 2,011,340 | 8/1935 | Lundy | 222/200 |
| 2,633,133 | 3/1953 | Higgins | 222/232 X |
| 2,967,056 | 1/1961 | D'Amato | 222/196 |
| 3,152,575 | 10/1964 | Singley et al. | 119/52 A |
| 3,173,582 | 3/1965 | Walter | 222/185 |
| 3,742,913 | 7/1973 | Crippen | 119/56 R |
| R26,275 | 10/1967 | Stevens | 222/231 |

Primary Examiner—Louis G. Mancene
Assistant Examiner—Peter K. Skiff
Attorney, Agent, or Firm—Karl W. Flocks

[57] ABSTRACT

A feed dispensing hopper of the type adapted to travel along the length of a battery cage arrangement to dispense feed into feed troughs extending along the battery cage arrangement which includes at least a pair of inclined wall portions converging to a channel portion to which feed is funneled by gravity. An auger device is provided in the bottom of the channel and is adapted to convey feed out through feed discharge outlets into the troughs. An agitating mechanism is provided to break up the feed that is funneled into the channel and a canopy or hood is disposed above the agitator to divert feed to opposite sides of the agitator and thus prevent packing of feed all around the agitator.

7 Claims, 8 Drawing Figures

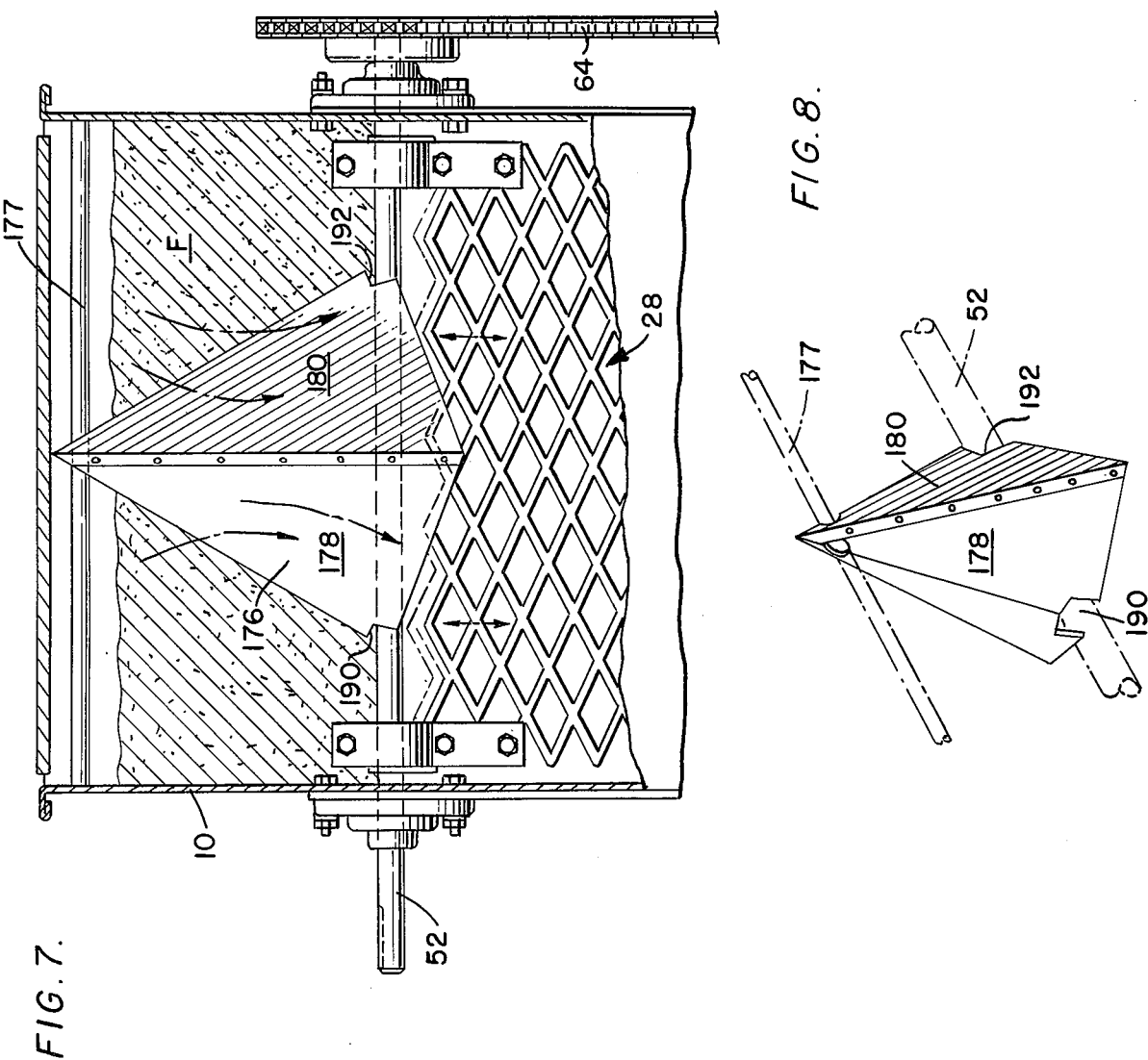
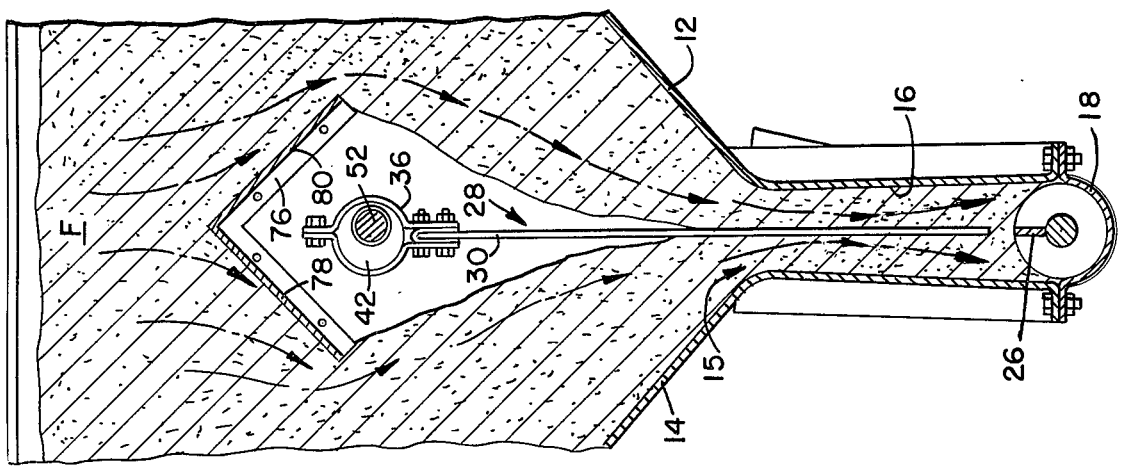

4,030,452

FEED DISPENSING HOPPER

BACKGROUND OF THE INVENTION

1. Field of the Invention

The present invention relates to devices for dispensing feed into feed troughs for poultry or the like which are confined in cage batteries.

2. Description of the Prior Art

Exemplifying prior art feeding apparatuses of the type to which the present invention appertains are the constructions disclosed in U.S. Pat. Nos. 2,536,621 and 2,791,200. Mobile or traveling feed dispensing hoppers are disclosed by both the Arnold and the Palmer, Jr. patents. In both the Arnold and Palmer, Jr. apparatuses feed contained in the respective hoppers is funneled under the force of gravity by converging wall portions toward discharge outlets. Generally speaking, the prior art feed dispensers of this type may have worked satisfactorily. However, it is known that in some instances feed tends to become packed in the lower portions of these hoppers with the result that feed dispensing is interrupted where outlets are clogged or where feed conveyor elements are jammed. Where feed is packed tightly in such hoppers, it is also possible for the feed to be dispensed at a greater than desired rate in compacted form rather than in a finely dispersible form. Feed can become packed in such hoppers where there is considerable moisture in the feed. The consistency of the type of feed also is a factor in whether or not feed becomes packed. Further, aggravating the situation is the fact that it is not unusual for dispensing hoppers of this type to handle as much as 50 to 100 pounds of feed.

SUMMARY OF THE INVENTION

The present invention relates to an improved feed dispensing hopper of the type adapted to travel along a battery cage arrangement and dispense feed into feed troughs with greater reliability and uniformity than previously attained.

The present invention also provides an improved feed dispensing hopper with a feed dispensing rate which may be more closely controlled than that is known in the prior art.

Another object of the present invention is to provide an improved feed dispensing hopper with which feed may be dispensed into feed troughs in a dispersed rather than compacted form.

A further object of the present invention is to provide and improved feed dispensing hopper in which the tendency for feed to become compacted therein is minimized and/or eliminated.

Still another object of the present invention is to provide an improved feed dispensing hopper in which positive means are provided for breaking up or agitating the feed to ensure dispersion thereof.

BRIEF DESCRIPTION OF THE DRAWINGS

FIG. 3 is a sectional view taken along the section 3—3 in FIG. 2;

FIG. 4 is a sectional view taken along the section 4—4 in FIG. 1;

FIG. 6 is a sectional view taken along the section 6—6 in FIG. 2;

FIG. 7 is a view similar to FIG. 2, but showing the use of an alternative canopy or hood element; and FIG. 8 is a view in perspective of the canopy or hood element shown in FIG. 7.

DETAILED DESCRIPTION OF THE INVENTION

Figure 1:
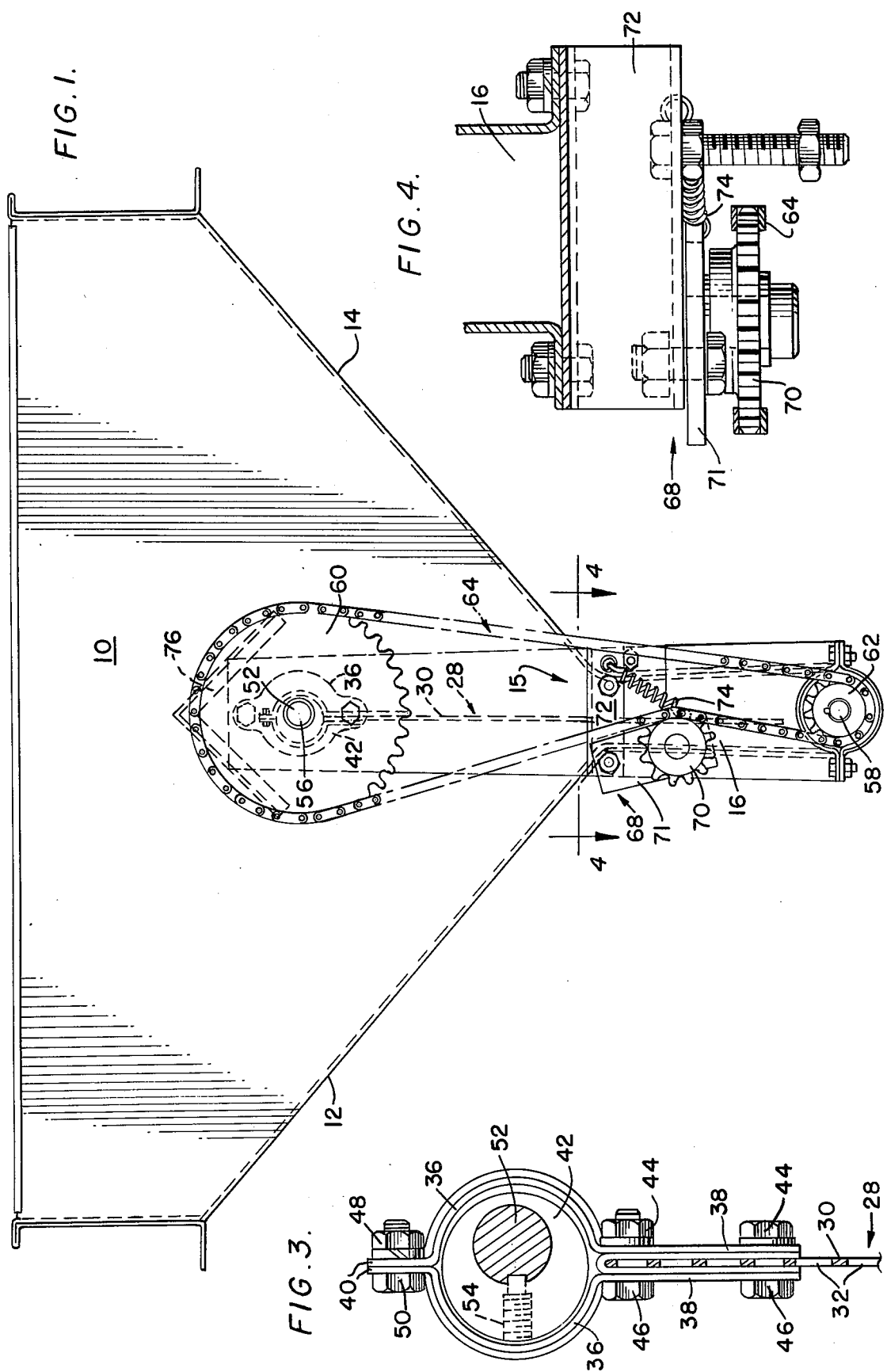
FIG. 1 show a side elevational view of one embodiment of a feed dispensing hopper according to the present invention.

Referring now in particular to FIGS. 1—6, the reader will readily appreciate that the present invention is embodied in an improved feed dispensing hopper 10 of the mobile or travelling type and including downwardly extending inclined walls 12 and 14 which converge toward and terminate at the mouth 15 of channel section 16. At the base 18 of channel 16 is a plurality of feed discharge outlets 20, 22 and 24. To dispense feed through outlets 20, 22 and 24 an auger mechanism 26 is disposed within channel 16 at the base 18 thereof and communicating with outlets 20, 22 and 24 from within hopper 10.

Suspended from a shaft 52 passing through hopper 10 at a substantial distance above the mouth 15 of channel 16 and extending downwardly therefrom is a feed agitator 28 which comprises a generally rigid plate or like member 30 with a network or plurality of openings 32. As may be clearly seen in FIGS. 1 and 6, plate 30 extends down through mouth 15, down into channel 16 for oscillation and/or generally vertical reciprocation thereinto which precludes packing of feed therein to preclude packing of feed thereat. The lower end of plate 30 reciprocates without interference with auger mechanism 26, coming within about half an inch of contact therewith, and has a vertical stroke of about half an inch. Secured at the upper end of plate 30 is a pair of spaced-apart brackets 34. Each bracket 34 includes arcuate sleeve portions 36, downwardly extending leg portions 38 and upwardly extending arm portions 40. In this arrangement sleeve portions 36 loosely surround bearing members 42, leg portions 38 are clamped to plate 30 by nuts 44 and bolts 46, and arm portions 40 are secured together by nut 48 and bolt 50. Each bearing member 42, which may be of low friction material, is secured to shaft 52 in eccentric relationship therewith by a set screw 54.

With a close look at the slope of the walls of channel 16, one will readily see that the walls diverge from mouth 15 in the downward direction toward auger mechanism 26 in the form of an inverted funnel. Because of the inverted funnel structure of channel 16 feed descending down past mouth 15 has the added tendency of spreading out rather than of becoming packed onto auger mechanism 26.

Figure 2:
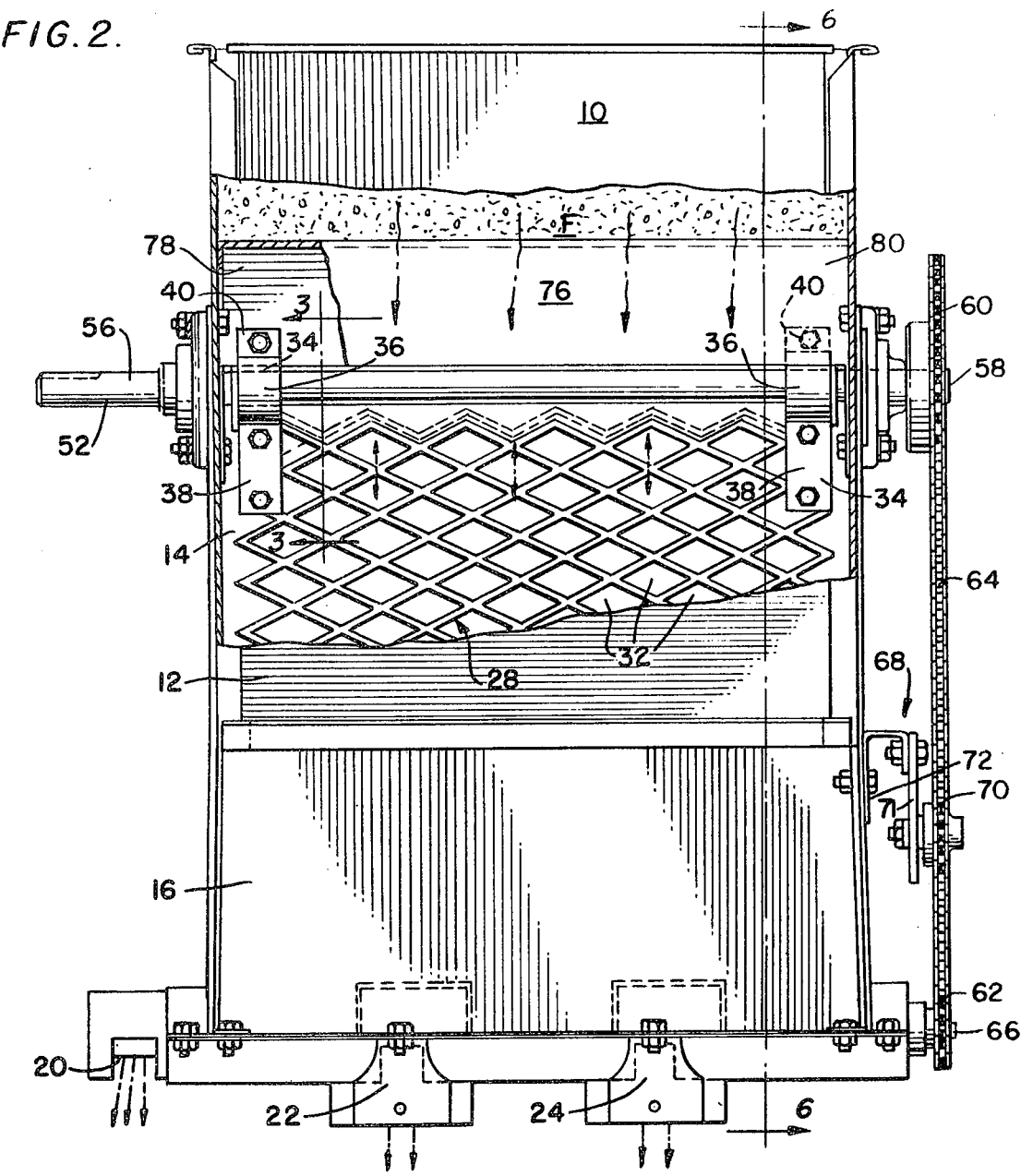
FIG. 2 shows a front or rear elevational view of the hopper of FIG. 1, depending upon direction of travel of the hopper, with portions broken away for clarity.

Shaft 52 includes a power input end 56 as seen in FIG. 2 and a power output end 58. Mounted on output end 58 of shaft 52 is a driving sprocket 60. Driving sprocket 60 drives driven sprocket 62 through chain 64. Attached to driven sprocket 62 is a shaft portion 66 of auger 26. Slack in chain 64 is automatically taken up by tension unit 68 which includes idler sprocket 70 which is rotatably supported on plate 71 pivotally secured to bracket 72. Tension spring 74 biases plate 71 and idler sprocket 70 toward chain 64 to automatically take up any slack which may develop.

Figure 5:
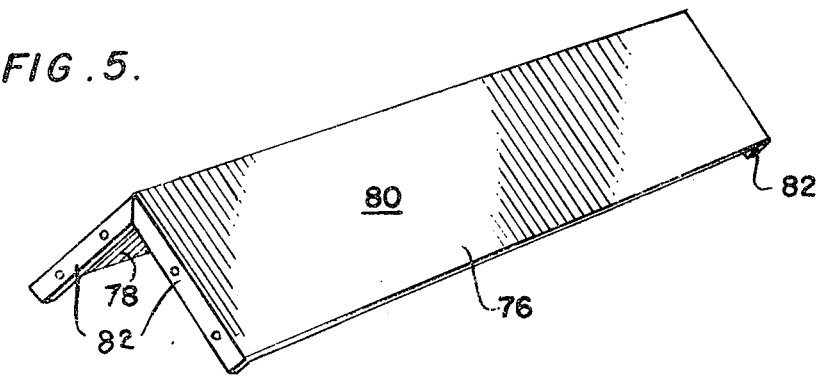
FIG. 5 is a view in perspective of a canopy or hood element which is shown in assembly in FIGS. 1, 2 and 6.

A canopy or hood element 76 in the form of an inverted V as seen in FIG. 5 is shown in assembly in FIGS. 1, 2 and 6. Canopy 76 as seen in FIGS. 1 and 6 is arranged so that downwardly diverging sides 78,80 provide umbrage over feed agitator 28 and shaft 52 from feed F so that feed is directed generally in the direction of arrows in FIG. 6 on descent due to gravity. Canopy 76 may extend for the full distance across hopper 10 and include flanges 82 which may be secured to hopper 10. In assembly canopy 76 is mounted in hopper 10 so as to be clear of agitator 28, sleeve portions 36, and shaft 52.

An alternate form of the canopy or hood element 76 is illustrated in FIGS. 7 and 8 in the embodiment of a pyramid 176 suspended above agitator 28 and shaft 52 by any convenient member such as a rod 177 extending across hopper 10. Pyramidal canopy 176 comprises a plurality of downwardly diverging sides 178, 180 as seen in FIG. 7 to divert descending feed F outwardly from the central zone of hopper 10. To allow for free rotation of shaft 52 without interference to or from pyramidal canopy 176 notches or cutouts 190 and 192 are provided at the base of canopy 176 in the areas which otherwise might interfere with shaft 52. The notches 190 and 192, as seen in FIG. 8, extend at least partially around shaft 52, but allow freedom of rotation of shaft 52 without interference from canopy 176.

OPERATION OF THE INVENTION

From the above description of the present invention including alternative forms of elements thereof, it is believed that the reader will readily appreciate that in operation hopper 10 is driven to the left and/or right from the position illustrated in FIG. 1. With hopper 10 driven as noted above, shaft 52 is driven in at least one direction of travel of the hopper 10, which may for purposes of discussion, be to the left of FIG. 1. In other words shaft 52 may be declutched as hopper 10 is traveling toward the right in FIG. 1. As hopper 10 is moving toward the left in FIG. 1 then, shaft 52 is rotated and power is delivered to driving sprocket 60 at output end 58 of shaft 52. Drive is transmitted through chain 64 to driven sprocket 62 whereby auger 26 is rotated by shaft portion 66 on which driven sprocket 62 is secured. As auger 26 is rotated feed is dispensed through outlets 20, 22 and 24. While feed is dispensed as thus described, bearings 42 which are fixed to shaft 52 by set screws 54 are caused to rotate along with shaft 52. Inasmuch as bearings 42 are eccentric to shaft 52 arcuate sleeve portions 36 which loosely surround bearings 42 slide free of the rotary effect of bearings 42, but are caused to ascend and descend with bearings 42 relative to shaft 52. In thus ascending and descending with bearings 42, agitator 28 is raised and lowered thereby and effects a breaking up or chopping of any feed which otherwise would tend to be compacted at or in the vicinity of the mouth 15 of channel 16. Because of the network of openings 32 in the generally rigid plate 30 of agitator 28, feed may be worked back and forth therethrough by the oscillating and/or reciprocating motion of agitator 28, which is caused to move as indicated by two-way arrows in FIGS. 2 and 7.

To ensure optimum dispensing of feed from hopper 10, canopy 80 by reason of its downwardly diverging sides 78 and 80 provide umbrage for agitator 28, shaft 52 and also mouth 15 of channel 16 to preclude packing of feed F thereabout. As seen in FIG. 6, feed F generally descends down along the top of sides 78 and 80 of canopy 76 and follows the paths generally indicated by arrows and leaves a protected area beneath the underside of sides 78 and 80. With the presence of canopy 76, it is clear that no heavy packing of feed can take place around shaft 52 and agitator 28.

In an embodiment employing a pyramidal canopy 176, it is noted that while as illustrated in FIG. 7 the base of the canopy does not extend to the sides of hopper 10, the base may be extended thereto. It is also noted that whereas canopy 76 is V-shaped with two diverging sides, in the alternative embodiment of pyramidal canopy, there are the two diverging sides 178,180 and additional diverging sides hidden from view in FIG. 7 and partially shown in FIG. 8. Because of the many diverging sides in pyramidal canopy 176, the feed F diverged or deflected thereby tends to collide with other descending feed and thereby also tends to break up or prevent packing at mouth 15 of channel 16, which funnels feed to auger 26. Canopy 176, as may be seen in FIG. 7, is suspended on rod 177, for example, and is further provided with notches or cutouts 190,192 in the base of sides 178, 180 and sides adjacent thereto whereby shaft 52 may turn freely without interference.

It will be obvious to those skilled in the art that various changes may be made without departing from the spirit of the invention and the invention is not to be considered limited to what is shown in the drawings and described in the specification.

What is claimed is:

1. A feed dispensing hopper apparatus of the traveling or mobile type for simultaneously dispensing feed into a plurality of feed troughs comprising a plurality of feed discharge outlets spaced apart from each other along a base of a hopper, feed conveying means for simultaneously conveying feed to and out through said outlets, means facilitating the funnelling of feed under gravity toward said conveying means, and means for preventing compacting of feed in the vicinity of said means facilitating the funnelling of feed, said means facilitating the funnelling of feed including downwardly converging wall portions of said hopper apparatus, and said means for preventing compacting of feed including a mouth at the lower end of said downwardly converging wall portions and downwardly diverging extensions from said wall portions down from said mouth whereby feed will tend to descend down to and past said mouth and thereafter will tend to spread out upon descending down past said mouth, said downwardly diverging extensions extending for a significant distance beyond said mouth, said conveying means being located at the bottom of said diverging extensions and just above said base, an agitator supported above said means facilitating the funnelling of feed and extending down through said mouth, between said diverging extensions to just above said feed conveying means, a rotatable shaft extending between upper ends of said downwardly converging wall portions and across other opposite walls of said hopper, a plurality of bearing members fixed on said shaft in eccentric relationship thereto, with said bearing members supporting said agitator in both a suspended and a sliding relationship thereto as said bearing members are rotated with said shaft whereby said agitator is raised and lowered with respect to said shaft by said bearing members, a canopy having at least two downwardly inclined or diverting sides extending at least partly around said shaft and over said agitator, and power transmission means for simultaneously driving said conveying means and said shaft on which said agitator is suspended.

2. The apparatus as defined in claim 1 wherein said canopy is in the form of an inverted V with sides thereof diverting feed to opposite sides of said agitator and said hopper.

3. The apparatus as defined in claim 2 wherein said shaft includes a power output end, gear means on said output end in driving engagement with driven means structurally connected to said conveying means.

4. The apparatus as defined in claim 1 wherein said canopy is pyramidal in form and arranged with sides thereof diverging in a downward direction whereby feed will be diverted thereby in a plurality of directions under the force of gravity.

5. The apparatus as defined in claim 4 wherein said canopy includes a base that is provided with notches extending at least partially around said shaft but allows of movement of said shaft without interference from said canopy.

6. The apparatus as defined in claim 1 wherein said agitator is in the form of a relatively rigid plate extending generally downwardly from said shaft 7. The apparatus as defined in claim 6 wherein said agitator includes a plurality of openings which allow for the passage of feed therethrough to opposite sides of said agitator.

* * * * *